United States Patent
Vasudevan et al.

(10) Patent No.: US 8,688,868 B2
(45) Date of Patent: Apr. 1, 2014

(54) STEERING DATA UNITS TO A CONSUMER

(75) Inventors: Anil Vasudevan, Portland, OR (US);
Partha Sarangam, Portland, OR (US);
Ram Huggahalli, Mesa, AZ (US); Sujoy Sen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/224,911

(22) Filed: Sep. 2, 2011

(65) Prior Publication Data

US 2012/0023272 A1    Jan. 26, 2012

Related U.S. Application Data

(63) Continuation of application No. 11/864,645, filed on Sep. 28, 2007, now Pat. No. 8,041,854.

(51) Int. Cl.
*G06F 13/00* (2006.01)
*H04L 12/28* (2006.01)

(52) U.S. Cl.
USPC .............................. 710/33; 370/351; 710/316

(58) Field of Classification Search
USPC .......................................................... 710/33
See application file for complete search history.

(56) References Cited

U.S. PATENT DOCUMENTS

| | | | |
|---|---|---|---|
| 6,957,281 B2 | 10/2005 | Mann et al. | |
| 7,620,046 B2 | 11/2009 | Ronciak et al. | |
| 7,743,176 B1 * | 6/2010 | Turney et al. | 710/22 |
| 7,792,102 B2 | 9/2010 | Cornett et al. | |
| 7,802,073 B1 | 9/2010 | Cheng et al. | |
| 2002/0091844 A1 * | 7/2002 | Craft et al. | 709/230 |
| 2004/0128453 A1 * | 7/2004 | Ido et al. | 711/147 |
| 2005/0132102 A1 | 6/2005 | Huggahalli et al. | |
| 2005/0198400 A1 * | 9/2005 | Minturn | 709/250 |
| 2006/0045089 A1 * | 3/2006 | Bacher et al. | 370/392 |
| 2006/0072562 A1 * | 4/2006 | King | 370/389 |
| 2006/0112227 A1 * | 5/2006 | Hady et al. | 711/130 |
| 2006/0153215 A1 | 7/2006 | Cornett et al. | |
| 2006/0277356 A1 * | 12/2006 | Speier et al. | 711/5 |
| 2008/0263339 A1 | 10/2008 | Kriegel et al. | |
| 2008/0270653 A1 * | 10/2008 | Balle et al. | 710/109 |

OTHER PUBLICATIONS

Non-Final Office Action for U.S. Appl. No. 11/864,645 Mailed Dec. 8, 2010, 9 Pages.
Notice of Allowance and Fees for U.S. Appl. No. 11/864,645 Mailed Jun. 9, 2011, 7 Pages.
Vasudevan et al., U.S. Appl. No. 11/864,645, titled as "Steering Data Units to a Consumer", filed Sep. 28, 2007, 24 pages.

* cited by examiner

*Primary Examiner* — Idriss N Alrobaye
*Assistant Examiner* — Brooke Taylor

(57) ABSTRACT

A computer system may comprise a second device operating as a producer that may steer data units to a first device operating as a consumer. A processing core of the first device may wake-up the second device after generating a first data unit. The second device may generate steering values after retrieving a first data unit directly from the cache of the first device. The second device may populate a flow table with a plurality of entries using the steering values. The second device may receive a packet over a network and store the packet directly into the cache of the first device using a first steering value. The second device may direct an interrupt signal to the processing core of the first device using a second steering value.

12 Claims, 3 Drawing Sheets

| FLOW IDENTIFIER 351 | SOCKET IDENTIFIER 352 | CONSUMER IDENTIFIER 353 | QUEUE IDENTIFIER 354 |
|---|---|---|---|
| FLOW-A | 101 | 101-A | 171-A |
| FLOW-B | 140 | 141-B | 181-B |
| FLOW-C | 101 | 101-B | 171-B |
| FLOW-D | 140 | 141-A | 181-A |
| ... | ... | ... | ... |
| FLOW-N | 101 | 101-K | 171-K |

*FIG. 3*

STEERING DATA UNITS TO A CONSUMER

This continuation application is related to, and claims priority to, U.S. patent application Ser. No. 11/864,645, entitled "STEERING DATA UNITS TO A CONSUMER" filed on Sep. 28, 2007 now U.S. Pat. No. 8,041,854, which is hereby incorporated by reference herein as though set forth in full.

BACKGROUND

A processing unit may comprise multiple processing cores, which may increase the performance of the processing unit. Also, as the data transfer speeds increase (e.g., 10 Giga-bit per second), the processing of network stack may consume higher processing cycles of the processing unit and bandwidth of internal buses such as a coherent bus, a front side bus, and a memory bus.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 3 illustrates a flow table used to steer the data units to the consumer.

DETAILED DESCRIPTION

The following description describes steering data units to a consumer. In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
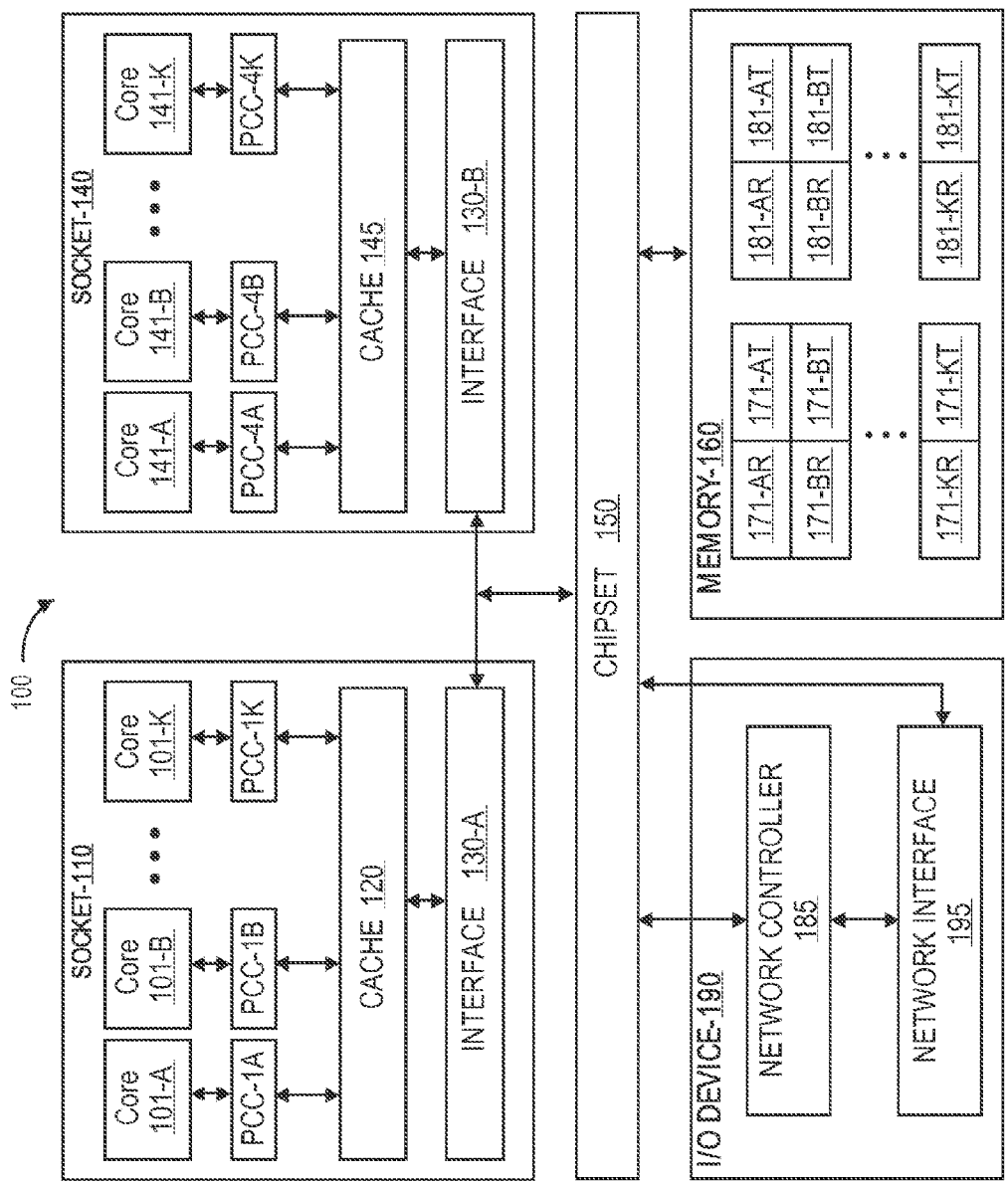
FIG. 1 illustrates an embodiment of a computing platform 100.

An embodiment of a computing platform 100 is illustrated in FIG. 1. The computing platform 100 may comprise a socket 110 and 140, a chipset 150, a memory 160, and an I/O device 190.

In one embodiment, the chipset 150 may comprise one or more integrated circuits or chips that couple the sockets 110 and 140, the memory 160, and the I/O device 190. In one embodiment, the chipset 150 may comprise controller hubs such as a memory controller hub and an I/O controller hub to, respectively, couple with the memory 160 and the I/O device 190. In one embodiment, the chipset 150 may comprise Intel® chipsets.

The memory 160 may store data and/or software instructions that the socket 110, 140, chipset 150, the I/O device 190, or any other devices of the computing platform 100 may access and perform operations. In one embodiment, the memory 160 may store a flow table created by the I/O device 190. In one embodiment, the memory 160 may comprise transmit queues 171-AT to 171-KT and 181-AT to 181-KT and receive queues 171-AR to 171-KR and 181-AR to 181-KR. In one embodiment, each of the queues 171 and 181 may be, respectively, associated with the cores 101 and 141. In one embodiment, the queue 181-BT may be used to store the data units generated by the core 141-B while transmitting the data units. In one embodiment, the queue 181-BR may be used to store the packets received over a network before the core 141-B retrieves the packets. In one embodiment, the memory 160 may comprise different types of memory devices such as, for example, DRAM (Dynamic Random Access Memory) devices, SDRAM (Synchronous DRAM) devices, DDR (Double Data Rate) SDRAM devices, or other volatile and/or non-volatile memory devices used in computer system 100.

In one embodiment, the socket 110 may comprise cores 101-A to 101-K coupled to per core caches (PCC) PCC-1A to PCC-1K, a shared cache 120, and an interface 130-A. In one embodiment, the socket 140 may also comprise multiple cores 141-A to 141-K coupled to per core caches (PCC) PCC 4A to PCC 4K, a cache 145, and an interface 130-B. In one embodiment, the interface 130-A and 130-B may couple the socket 110 and 140 to each other and to the chipset 150 of the computer system 100. In one embodiment, the socket 110 and 140 may comprise the shared cache 120 and 145, which may comprise fast memory with lower access times. In one embodiment, the sockets 110 and 140 may be coupled by a coherent bus.

The core 101-A may support an interrupt service routine (ISR), a driver, and a network stack and the core 141-B may support an application such as file transfer protocol (ftp), or e-mail, or Telnet. The I/O device 190 may receive data units and may store the data units in the memory 160. The I/O device 190 may also interrupt the core 101-A, which may process the interrupt, perform network stack processing, and signal the core 141-B. The core 141-B may complete additional processing including the network processing before retrieving the data units stored in the memory 160 in response to receiving the signal from the core 101-A. The signaling between the cores 101-A and 141-B and associated data movement that may be caused due to shared data elements updated in the core 101-A and subsequently accessed by the core 141-B may consume bandwidth of the buses and processing cycles of the cores 101-A and 141-B. Also, retrieval of data units from the memory 160 may consume processing cycles of the core 141-B and bandwidth of the memory and the coherent bus. Also, movement of data between the cores 101 and 141 may cause cache pollution due to cache lines being shared. Such an approach may cause sub-optimal performance of the computer system 100.

To improve the performance of the computer system 100, in one embodiment, each of the cores 101 and 141 may support interrupt service routines, drivers, protocol stacks, and applications. In one embodiment, the core 141-B may support a protocol stack such as a TCP/IP stack, UDP, VLAN, and applications such as e-mail, ftp, telnet, audio, and video. In one embodiment, the cores 101 and 140 of the sockets 110 and 140 may perform dual roles of a consumer and a producer. In one embodiment, the core 141-B may be referred to as a consumer if the core 141-B consumes the data units or the packets produced by a producer such as the I/O device 190. In one embodiment, the core 141-B may be referred to as a producer if the core 141-B generates the data units for the consumption of a consumer such as the I/O device 190.

In one embodiment, the cores 101 and 141 may support an operating system, which may schedule the threads associated with the applications on the cores where the thread was previously scheduled. In one embodiment, such an approach may be based on a scheduling property that the probability of the data structures, accessed by the applications, being resident in the shared cache 120 and 145 is high. In one embodiment, application targeted routing may use the scheduling property to steer the data units to a consumer. In one embodiment, the cores 101 and 141 may support a direct I/O (DIO) read and a direct I/O (DIO) write transaction.

In one embodiment, the core 141-B, while operating as a producer, may wake-up the I/O device 190. Before waking-up the I/O device 190, the core 141-B may generate one or more data units. In one embodiment, the data unit may comprise a descriptor, a header, and a payload. In one embodiment, the descriptor may comprise control information such as the pointers to the header and the payload and actions that may be carried out on the header and the payload. In one embodiment, the descriptor may also comprise control information, which may indicate the storage area from which data units may be read and written into. In one embodiment, after creating the descriptor, the driver supported by the core 141-B may wake-up the I/O device 190.

In one embodiment, the core 141-B may store the data units in the per core cache PCC-4B associated with the core 141-B. In one embodiment, the identifier of a per-core cache in which the data units are stored and the identifier of the socket supporting the per-core cache may be used by the I/O device 190 to generate one or more steering values. In one embodiment, the steering values may comprise a core identifier (CID) element and a socket identifier (SID) element. In one embodiment, the socket identifier (SID) element may be used to identify the shared cache 145 from which data units may be read and into which the packets may be stored by the I/O device 190. In one embodiment, the core identifier (CID) element may be used to identify the core 141-B, which may be interrupted after storing the packets, directly, into the shared cache 145 or the per core cache PCC-4B. In other embodiment, the core 141-B, while generating the data units, may also configure the steering values and associate the steering values with the data units.

In one embodiment, the core 141-B may generate the header portion in addition to generating the descriptor portion and payload portion of the data unit. In one embodiment, the header portion may comprise transmit flow information. In one embodiment, the transmit flow information may comprise a source address and a destination address. In other embodiment, the transmit flow information may comprise a source port identifier and a destination port identifier. In one embodiment, the header portion may be generated using a TCP/IP, or a UDP, or an asynchronous transfer mode (ATM), or such similar other formats.

In one embodiment, the core 141-B may also generate a receive flow information, which may comprise pointers indicating to the storage area into which the receive data or packets may be stored. In one embodiment, the interrupt service routines (ISR) supported by the core 141-B may generate the receive flow information. In one embodiment, the receive flow information may comprise pointers, which may indicate the storage area for storing the packets received over the network. In one embodiment, the receive flow information may comprise a pointer pointing to the queue 181-BR to store the packets. In one embodiment, the association between the core 141-B and the queue 181-BR may be used to steer an interrupt signal to the core 141-B.

In one embodiment, the core 141-B, while operating as a consumer, may receive an interrupt signal from the I/O device 190. In one embodiment, the core 141-B may retrieve the packets stored in the shared core 145 or the per core cache PCC-4B in response to receiving the interrupt signal.

In one embodiment, the I/O device 190 may comprise a network device such as a network interface controller (NIC) card. In one embodiment, the I/O device 190 may comprise a network controller 185 and a network interface 195. In one embodiment, the I/O device 190 may also perform dual roles of a consumer and a producer. In one embodiment, the I/O device 190 may be referred to as a consumer if the I/O device 190 consumes the data units produced by a producer such as the core 141-B. In one embodiment, the I/O device 190 may be referred to as a producer if the I/O device 190 generates the data units for the consumption of a consumer such as the core 141-B.

In one embodiment, the network interface 195 may receive data units from the queues 171 and 181 and may transfer the data units over the network while the I/O device 190 operates as a consumer. In one embodiment, the I/O device 190, while operating as a producer, may steer the packets received over the network to a core using the flow table entries. In one embodiment, the network interface 195 may receive packets over the network and store the packets into the queue 171 or 181 specified by the network controller 185. In one embodiment, the network interface 195 may provide physical, electrical, and protocol interface between the computer system 100 and the network.

In one embodiment, the I/O device 190, while operating as a consumer, may wake-up in response to receiving a wake-up signal from the core such as the core 141-B. In one embodiment, the network controller 185 may initiate a DIO read transaction after waking-up. In one embodiment, the DIO read transaction may be directed at addresses comprising data units created by the core 141-B, which may be present in the shared core 145 or the PCC-4B based on the source (core 141-B) of generation of the wake-up signal. In one embodiment, the network controller 185 may retrieve the descriptor portion. In one embodiment, the network controller 185 may decode the descriptor portion. In one embodiment, the descriptor portion may comprise pointers to the header portion and the payload portion.

In one embodiment, the network controller 185 may perform a DIO read transaction to read the header portion and the payload portion. In one embodiment, if the data units happen to reside in the PCC-4B or the shared cache 145, the DIO read transaction may return along with the data, the CID, and the SID values to the network controller 185. In one embodiment, the network controller 185 may check for the presence of the data units in the other per core caches before generating the steering values. In one embodiment, the network controller 185 may generate the steering values using one or more indicators in the data unit. In one embodiment, the steering values may comprise the CID element and the SID element. In one embodiment, the network controller 185 may generate the CID element using the information of the location from which the data unit was read. In one embodiment, the network controller 185 may generate the CID element to equal 141-B if the data unit was read from the PCC-4B as the PCC-4B is associated with the core 141-B. In one embodiment, the network controller 185 may also generate the SID element to equal 140 as the PCC-4B is supported by the socket 140. In one embodiment, the network controller 185 may extract the transmit flow information from the header portion and associate the flow information with the CID element and the SID element.

In one embodiment, the network controller 185 may also generate a queue identifier element associated with the CID element. In one embodiment, the queue identifier element may represent the core that is to be interrupted. In one embodiment, the network controller 185 may interrupt the core 141-B and may retrieve the receive flow information by performing a DIO read transaction. In one embodiment, the receive flow information may comprise a descriptor. In one embodiment, the descriptor may comprise a pointer to indicate the storage area into which the packets received over the network may be stored.

In one embodiment, the network controller 185 may receive a pointer pointing to the PCC-4B or the shared cache 145 as the storage area for storing the packets. In one embodiment, the network controller 185 may use the pointer information in the descriptor to map the interrupt or a queue identifier to the CID element. In one embodiment, the network controller 185 may map the queue 181-B provisioned to store packets destined to the core 141-B and the CID element 141-B. In one embodiment, the network controller 185 may create a flow table 300 comprising association between the CID element, the SID element, the flow identifier element, and the queue identifier. In one embodiment, the network controller 185 may store the flow table in the memory 160. In one embodiment, the network controller 185 may also store the flow table in a memory area within the local memory of the network controller 185. In other embodiment, the network controller 185 may extract the steering values configured by the core 141-B in the descriptor.

In one embodiment, while operating as a producer, the network controller 185 may extract the flow information embedded in the packets received by the network interface 195 over the network. In one embodiment, the network controller 185 may compare the flow information embedded in the data units with the flow identifier field of the flow table 300. In one embodiment, the flow table 300 may comprise a list of flow identifiers and each flow identifier may be associated with a SID, a CID, and a queue identifier.

In one embodiment, the network controller 185 may store the packets in a queue identified by the queue identifier. In one embodiment, the network controller 185 may store the packets in the queue 181-BR if the flow information in the packet matches with the flow identifier that comprise 181-BR as the queue identifier. In one embodiment, the network controller 185 may transfer the packets to the shared cache 145 or the PCC-4B using the SID element associated with the matching entry. In one embodiment, the network controller 185 may steer the data units to an appropriate core based on the steering values, and the flow identifiers.

In one embodiment, the network controller 185 may perform a DIO write transaction, which may directly write the data units into the shared cache 145 or the PCC-4B. In one embodiment, the packets written from the network controller 185 may be stored in the shared cache 145 in the "M" state of the MESI protocol thus, maintaining coherency for the DIO write transactions.

In one embodiment, the network controller 185 may interrupt the core 141-B after storing the packets into the shared cache 145 or the PCC-4B. In one embodiment, the network controller 185 may use the CID element to determine the core to be interrupted.

Figure 2:
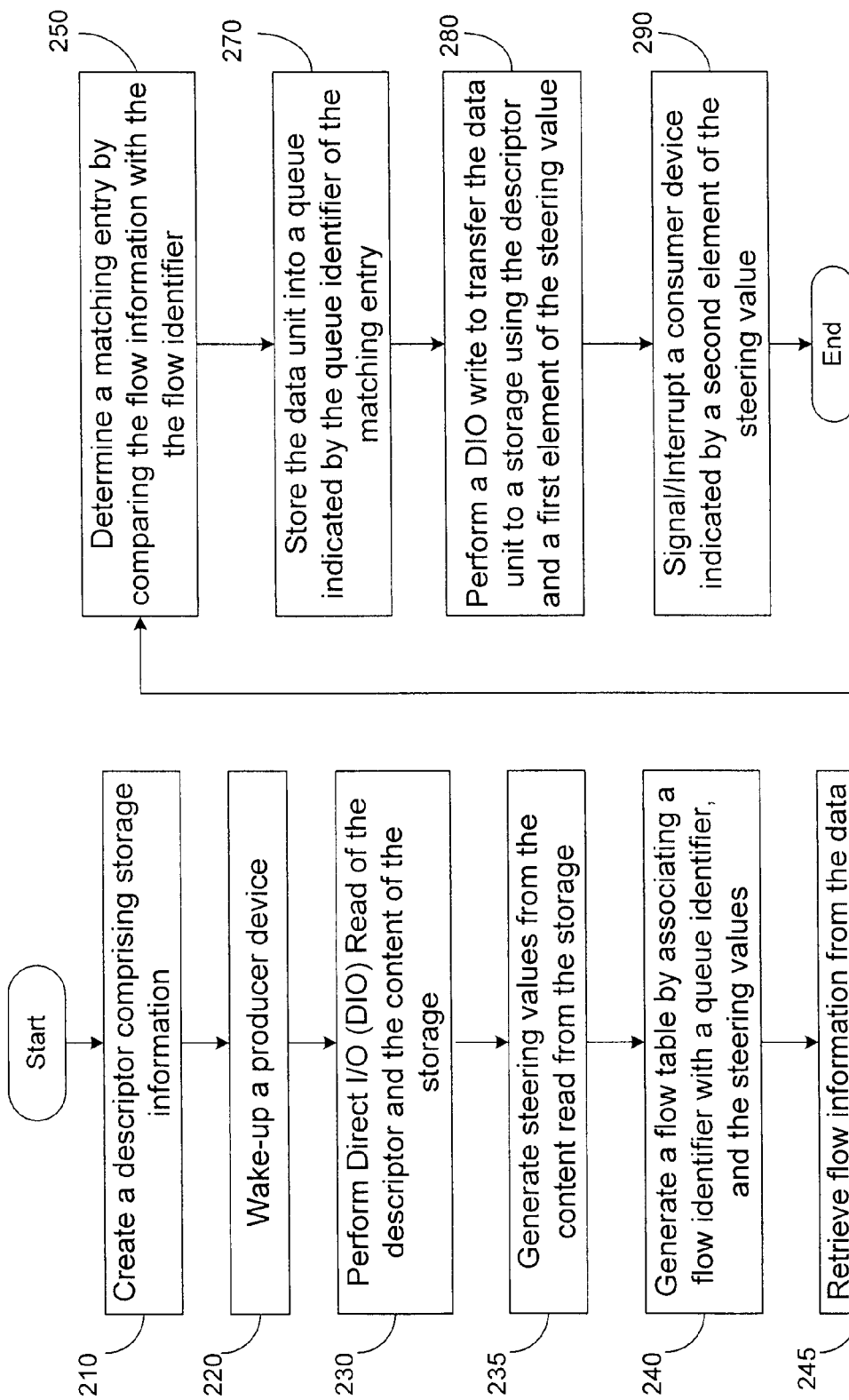
FIG. 2 illustrates an embodiment of an operation of the computing platform 100, which may steer the data units to a consumer.

An embodiment of an operation of the computing system 100, which may steer the data units to an appropriate core is illustrated in FIG. 2. In block 210, the producer such as the core 141-B may create a descriptor comprising storage information. In one embodiment, a driver supported on the core 141-B may create a descriptor. In one embodiment, the descriptor may comprise the storage information such as the pointers, which point to the storage area from which the data units may be retrieved and into which the packets may be stored.

In block 220, the producer (core 141-B) may wake-up the consumer (I/O device 190) by sending a wake-up signal. In block 230, the consumer such as the I/O device 190 may perform DIO read to read the descriptor and the contents of the storage. In one embodiment, the I/O device 190 may read the descriptor, which may be resident in the shared cache 145 or the PCC-4B. In one embodiment, the I/O device 190 may read the contents of the descriptor from the shared cache 145 or the PCC-4B.

In block 235, the consumer such as the I/O device 190 may generate the steering values from the data unit read from the cache of the producer. In one embodiment, the data unit may be passed down to the consumer as a result of the DIO read transaction. In one embodiment, the steering values may comprise a socket identifier (SID) element and a core identifier (CID) element. In other embodiments, the consumer such as the core 141-B may configure the steering values and may associate the steering values with the data units. In one embodiment, the steering values may comprise the socket identifier (SID) element and the core identifier element (CID). For example, the CID may equal 141-B and SID may equal 140.

In block 240, the consumer such as the network controller 185 of the I/O device 190 may generate a flow table 300 by associating a flow identifier with the steering values and the queue identifier. In one embodiment, a queue identifier, a socket identifier, and a core identifier element may be associated with each flow identifier.

An embodiment of a flow table 300 generated by the consumer, as described in block 240, is depicted in FIG. 3. In one embodiment, the flow table 300 may be populated by the network controller 185 of the I/O device 190. In one embodiment, the flow table 300 may comprise a flow identifier 351, a socket identifier 352, a consumer identifier 353, and a queue identifier 354. In one embodiment, the table 300 may comprise rows 301 to 340. In one embodiment, the row 301 is shown comprising (Flow-A, 110, 101-A, and 171-A), row 302 comprises (Flow-B, 140, 141-B, and 181-B), row 303 comprises (Flow-C, 101, 101-B, and 171-B), row 304 comprises (Flow-D, 140, 141-A, and 181-A), and row 340 comprises (Flow-E, 101, 101-K, and 171-K).

In block 245, the I/O device 190 may retrieve flow information from a received packet. In one embodiment, the I/O device 190 may switch to a producer mode of operation. In one embodiment, the I/O device 190 may extract the flow information embedded in the packet.

In block 250, the producer may determine the matching entry by comparing the flow information of the packet with the entries in the flow identifier 351. In one embodiment, the flow information of the packet may relate to the flow identifier 'Flow-B' in the table 300. In one embodiment, the producer may determine that the entry in the row 302 is the matching entry as the flow information of the packet matches with the flow identifier 'Flow-B' of the row 302.

In block 270, the producer may store the payload of the packet into a queue identified by the queue identifier 355 of the matching entry in row 302. In one embodiment, the queue identifier field of the matching entry in row 302 may equal 181-BR.

In block 280, the producer may perform a DIO write transaction to transfer the payload of the packet to a storage such as the shared cache 145 or the PCC-4B. In one embodiment, the producer may use the first steering element (entry in socket identifier 352), which may equal 140 to recognize the shared cache 145 of the socket 140. In one embodiment, the queue 181-BR may be linked or paired with the socket 140 or the core 141-B such that the payload in the queue 181-BR may be transferred to the shared cache 145 or the PCC-4B.

In block 290, the producer may interrupt the consumer based on the second steering element (entry in core identifier 353), which may be equal to 141-B. In one embodiment, the entries of the core identifier 353 may indicate the core which is to be interrupted. After receiving the interrupt signal, the core 141-B may service the ISR and retrieve the payload from the shared cache 145 or the PCC-4B.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A computer system comprising:
a plurality of input-output devices including a network interface device,
a chip set,
a plurality of sockets, individual ones of the sockets including multiple processor cores and at least one shared cache,
wherein the network interface device is to:
retrieve flow information from a packet received over a network,
identify a matching flow identifier entry after matching the flow information with one or more flow identifier entries in a flow table, wherein the network interface device to create the flow table before receiving the packet,
store the packet in a queue identified by a queue identifier in the matching flow identifier entry,
identify a first socket of the plurality of sockets and a first core of the first socket using steering values in the matching flow identifier entry, and
transfer the packet from the queue to a per core cache associated with the first core of the first socket;
wherein the network interface device is to generate an interrupt to the first core, wherein the first core is identified using the core identifier; and
wherein the first core to service the interrupt to retrieve the packet from the per core cache of the first core.

2. The computer system of claim 1, wherein the network interface device is to transfer the packet from the queue to a shared cache provided within the first socket and the shared cache is shared by the plurality of cores including the first core.

3. The computer system of claim 1, wherein the queue is paired with the first core.

4. The computer system of claim 1, wherein the steering values include a socket identifier to identify the first socket of the plurality of sockets.

5. The computer system of claim 1, wherein the steering values further include a core identifier to identify one of the plurality of cores of the first socket to which the packet is to be transferred.

6. Instructions, stored on a non-transitory computer readable medium, which cause a processor to be capable to:
determine packet steering for network packets belonging to at least one network packet flow based, at least in part, on an identification of a socket, among multiple sockets, having multiple processor cores and at least one shared cache, the determined packet steering comprising identification of a receive queue for the network packet flow; and
cause steering of packets belonging to the at least one network packet flow based on the determined packet steering;
wherein the instructions which cause the processor to be capable to determine packet steering comprise instructions which cause the processor to be capable to:
determine a producer core of an egress network packet; and
based, at least in part, on the producer core, determine the packet steering;
wherein the at least one network packet flow comprises a Transmission Control Protocol/Internet Protocol (TCP/IP) packet flow; and
wherein the instructions which cause the processor to be capable to determine packet steering comprise instructions which cause the processor to be capable to determine packet steering based on a shared cache of a cache hierarchy.

7. The instructions of claim 6, wherein the instructions which cause the processor to be capable to cause steering of packets comprise instructions which cause the processor to be capable to cause data associated with a received network packet belonging to the at least one network packet flow to be in the shared cache of the socket.

8. A method, comprising:
determining packet steering for network packets belonging to at least one network packet flow based, at least in part, on an identification of a socket, among multiple sockets, having multiple processor cores and at least one shared cache, the packet steering comprising identification of a receive queue for the network packet flow; and causing steering of packets belonging to the at least one network packet flow based on the determined packet steering;

wherein determining packet steering comprises:

determining a producer core of an egress network packet; and based, at least in part, on the determine producer core, determining the packet steering;

wherein the at least one network packet flow comprises a Transmission Control Protocol/Internet Protocol (TCP/IP) packet flow; and wherein the determining packet steering comprises determining packet steering based on a shared cache of a cache hierarchy.

9. The method of claim 8, wherein the causing steering of packets comprises causing data associated with a received network packet belonging to the at least one network packet flow to be in the shared cache of the socket of the multiple processor cores.

10. An apparatus, comprising circuitry capable to:

determine packet steering for network packets belonging to at least one network packet flow based, at least in part, on an identification of a socket, among multiple sockets, having multiple processor cores and at least one shared cache, the determined packet steering comprising identification of a receive queue for the network packet flow; and cause steering of packets belonging to the at least one network packet flow based on the determined packet steering;

wherein the circuitry is capable to cause data associated with a received network packet belonging to the at least one network packet flow to be in the shared cache of the socket of the multiple processor cores;

wherein the circuitry is capable to:

determine a producer core of an egress network packet; and based, at least in part, on the producer core, determine the packet steering;

wherein the at least one network packet flow comprises a Transmission Control Protocol/InternetProtocol (TCP/IP) packet flow; and wherein the circuitry is capable to determine packet steering based on a shared cache of a cache hierarchy.

11. The apparatus of claim 10, wherein the circuitry is capable to cause data associated with a received network packet belonging to the at least one network packet flow to be in the shared cache of the socket of the multiple processor cores.

12. The apparatus of claim 10, wherein the apparatus comprises a network interface controller.

* * * * *